(No Model.)
J. P. PONTON.
HORSE DETACHER.
No. 597,363. Patented Jan. 11, 1898.
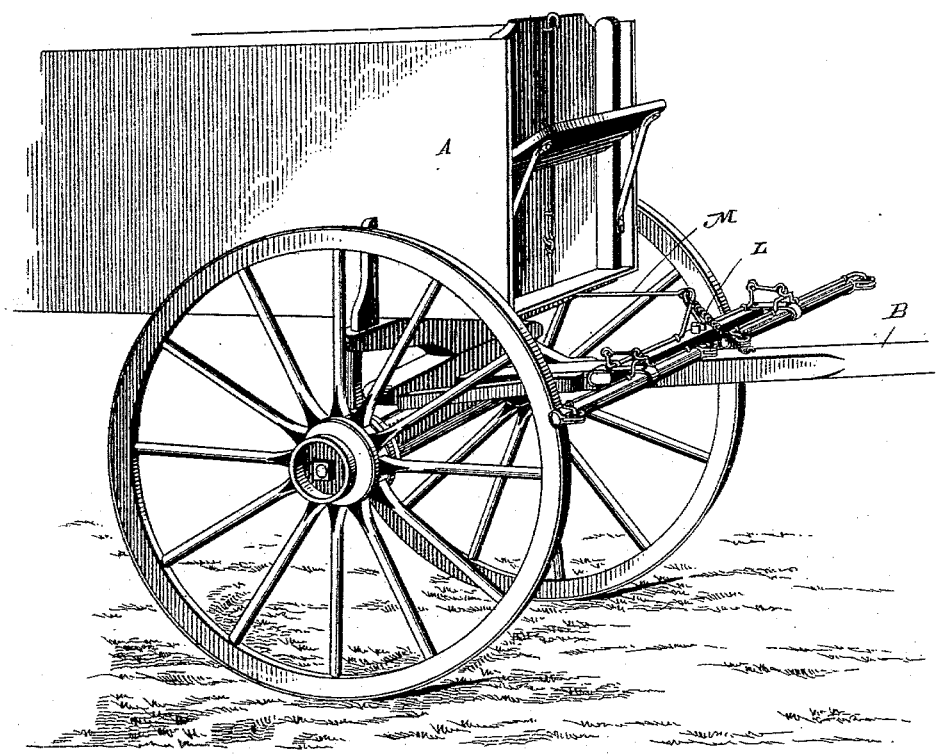
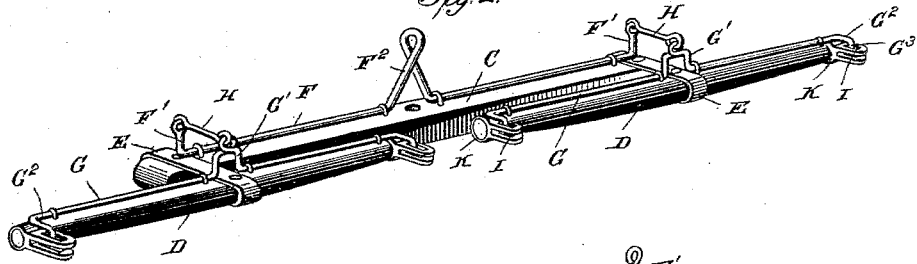
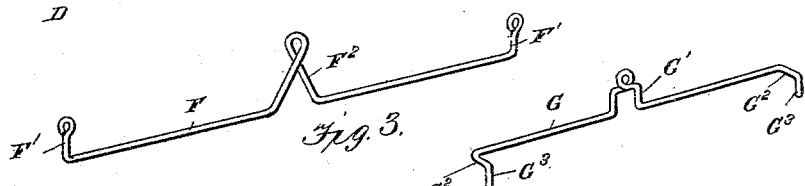
Witnesses
J. C. Shaw
Chas. E. Brock
Inventor
J. P. Ponton,
D. J. O'Meara & Co.
Attorneys
THE NORRIS PETERS CO., PHOTO-LITHO., WASHINGTON, D. C.

UNITED STATES PATENT OFFICE.

JOSEPH P. PONTON, OF LEXINGTON, TEXAS.

HORSE-DETACHER.

SPECIFICATION forming part of Letters Patent No. 597,363, dated January 11, 1898.

Application filed December 2, 1896. Serial No. 614,224. (No model.)

*To all whom it may concern:*

Be it known that I, JOSEPH P. PONTON, residing at Lexington, in the county of Lee and State of Texas, have invented a new and useful Singletree Attachment, of which the following is a specification.

This invention is a new and useful horse-detaching device, the object being to provide an exceedingly cheap and simple device which can be applied to all classes of vehicles and can be so operated when desired as to release the traces from the whiffletrees, thereby allowing the horses to escape from the vehicle.

With this object in view my invention consists in the peculiar construction of the various parts and in the novel manner of combining or arranging the said parts, all of which will be fully described hereinafter and pointed out in the claims.

In the drawings forming a part of this specification, Figure 1 is a view showing the practical application of my invention. Fig. 2 is a detail perspective view showing the invention as applied to the doubletree and singletrees of the heavier draft-vehicle. Fig. 3 shows the operating-levers detached. Fig. 4 is a perspective view of the trace fastener or holder arranged upon the end of the whiffletree.

In the drawings I have shown the invention applied to a vehicle A, having the draft-pole B, and mounted upon said pole is the ordinary construction of doubletree C, to which are connected the singletrees D by means of the clip-irons E, arranged at the opposite ends of the doubletree, and in which the singletrees are pivoted, as most clearly shown in Figs. 1 and 2. A rocking bar or rod F is mounted upon the top of the doubletree and has the crank-arms F' at each end and a central lever portion F$^2$. A similar rocking bar or rod G is arranged upon each whiffletree, the central portion being cranked, as shown at G', and connected to the crank portion F' by means of a link H. Each rod or bar G is bent forwardly, as shown at G$^2$, then downwardly, as at G$^3$, thereby providing a hook adapted to engage the trace, which is adapted to be passed between the perforated guide-plates I, carried by the ferrule K, adapted to be fitted upon the end of the whiffletree. A coil-spring L is attached at its forward end to the tongue B in advance of the doubletree and connects at its upper end to the upper portion of the lever member F$^2$. An operating-cord M is attached also to the said lever member F$^2$ and passes upward within reach of the driver.

Whenever it is desired to release the horses, the cord M is drawn so as to rock the bar or rod F in that direction, which bar or rod rocks the rods or bars G through the medium of the links H, thereby lifting the hooks clear of the ends of the traces, so that the horses are free to escape from the vehicle. The brake is then of course applied and the vehicle stopped.

It will thus be seen that I provide an exceedingly cheap and simple construction of horse-detacher or whiffletree-hook which can be quickly and easily operated for the purpose of releasing the horse from the vehicle, and while I have illustrated the invention as applied to a wagon it will of course be understood that it can be also applied to carriages and other vehicles, and, furthermore, can be applied to the singletree independent of any application to the doubletree.

Having thus described my invention, what I claim as new, and desire to secure by Letters Patent, is—

A combined horse-detacher and whiffletree attachment comprising the draft-pole B, the doubletree C mounted upon said pole, the singletrees D connected with the doubletree by the clip-irons E arranged on opposite ends of the doubletree, and in which the singletrees are pivoted, a rocking bar F, mounted on the top of the doubletree provided with the crank-arms F' at each end, the central lever portion F$^2$, a bar G on the whiffletree, the central portion G', the link connection H, the guide-plates I carried by the ferrule K, to fit on the end of the whiffletree, a coil-spring L attached to the draft-pole B connected at its upper end to the lever member F$^2$, and an operating-cord M attached to said member F$^2$, as and for the purpose set forth.

J. P. PONTON.

Witnesses:
   J. B. PONTON,
   R. W. TYLER.